March 6, 1928.

C. A. LEMASTER

TOASTER

Filed March 21, 1927

INVENTOR
Charles A. Lemaster.
BY
ATTORNEY

March 6, 1928.

C. A. LEMASTER 1,661,294

TOASTER

Filed March 21, 1927    2 Sheets-Sheet 2

INVENTOR
Charles A. Lemaster
BY
ATTORNEY

Patented Mar. 6, 1928.

1,661,294

UNITED STATES PATENT OFFICE.

CHARLES A. LEMASTER, OF KANSAS CITY, MISSOURI.

TOASTER.

Application filed March 21, 1927. Serial No. 176,934.

My invention relates to electrically heated utensils and more particularly to electric toasters and griddles.

My object is to provide an electrically heated cooking device of attractive appearance that may be used in the preparation of food for direct service and delivery from the utensil to the consumer, having a variety of members for handling different food items, and having improved means of adjustment to various demands of use.

The structure in which my invention is embodied, and representing the accomplishment of my object, will be particularly described with references to the drawings in which:

Fig. 1 is a perspective view of the device, the top being raised, and parts broken away to show other parts.

Fig. 2 is a vertical sectional view.

Figure 5:
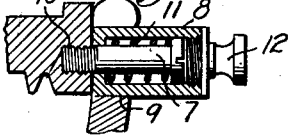

Fig. 5 is a sectional view of the means of securing a griddle plate in a griddle member.

Referring in detail to the drawings:

1 designates the base member and 2 the cover member of my device, and 3 a pedestal on which the base member is secured in a manner to provide an attractive appearance, by bolts and washers as at 4. The pedestal, base and cover are constructed hollow, for lightness and utility. The base member is provided with bosses 5 adjacent its periphery and spaced from its upper face, on which a disk-like griddle plate 6 is designed to seat, the plate and shoulder being so designed that the plate fits snugly in the base member, and is retained by a screw 7 projecting through housing 8 mounted in an opening 9 of the base member, the screw threaded in a threaded opening 10 of the edge 7 of the plate, and being forced toward withdrawal from the housing by the spring 11 bearing against the inner housing wall and the head of the screw, a threaded plug 12 closing the housing. The plate is further retained by means of a pin 13 fixed to the plate edge diametrically opposite to the screw 7 and received by a recess 14 of the base adjacent the periphery of the same.

Similarly the cover is provided with bosses providing ledges 15 on which a plate 16 similar to that installable in the base, is fixed by a similar screw assembly represented by the numeral 17 and by the pin 18 and cover recess 19 similar to these elements of the base assembly. Vertical bosses 20 are provided in the base having shoulders 21 to receive and support asbestos sheets 22, and resting on the shield and supported by the bosses, is a heat-dispensing ring 23 having terminals 24, 25 and 26 for connection with the three wires 27, 28 and 29, and these associated with a fourth current wire 30, led into the switch housing 31 controlled by the button 32, the switch being represented by the portion 33 of the dial on Fig. 4.

Figure 1:
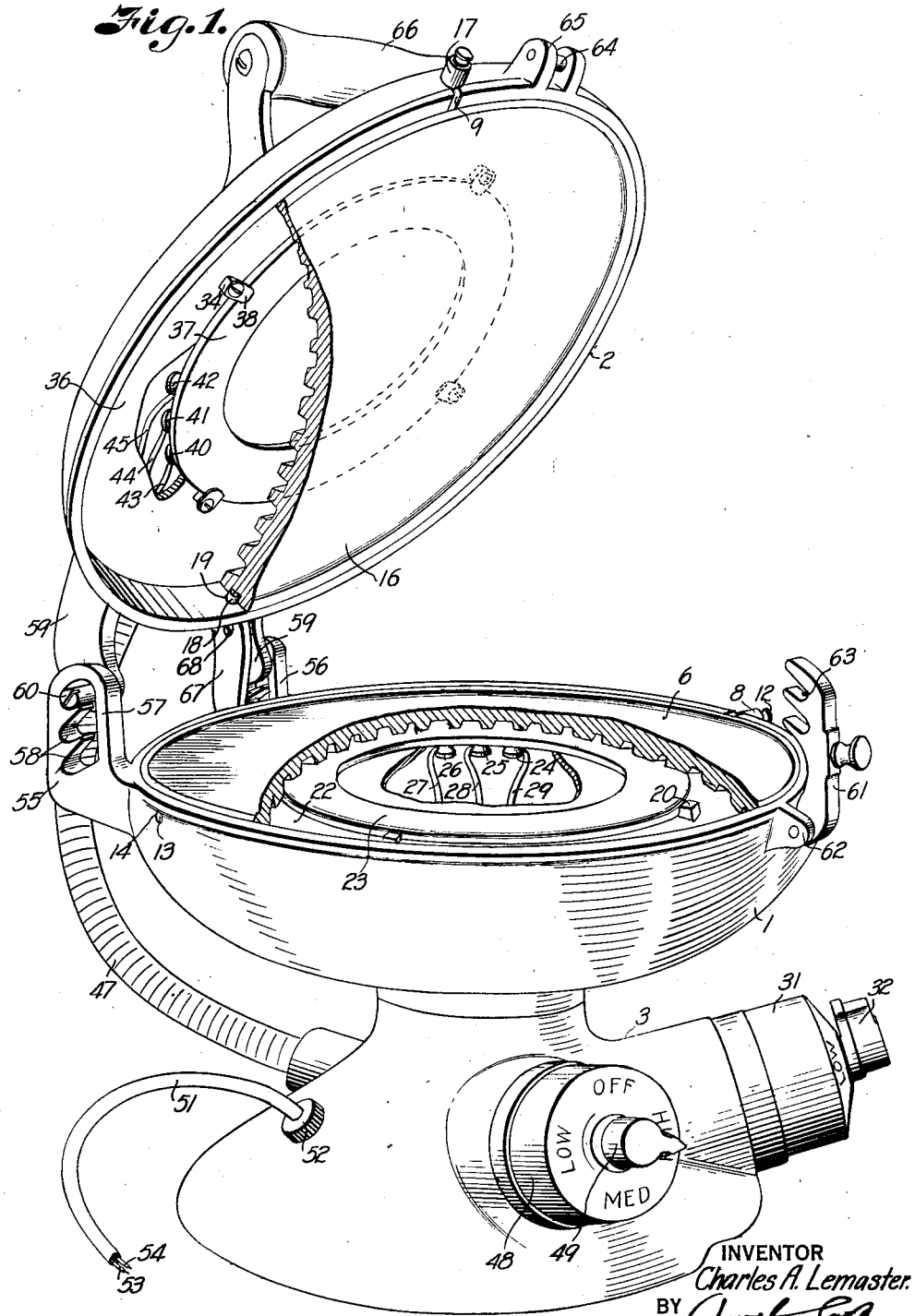
Figure 2:
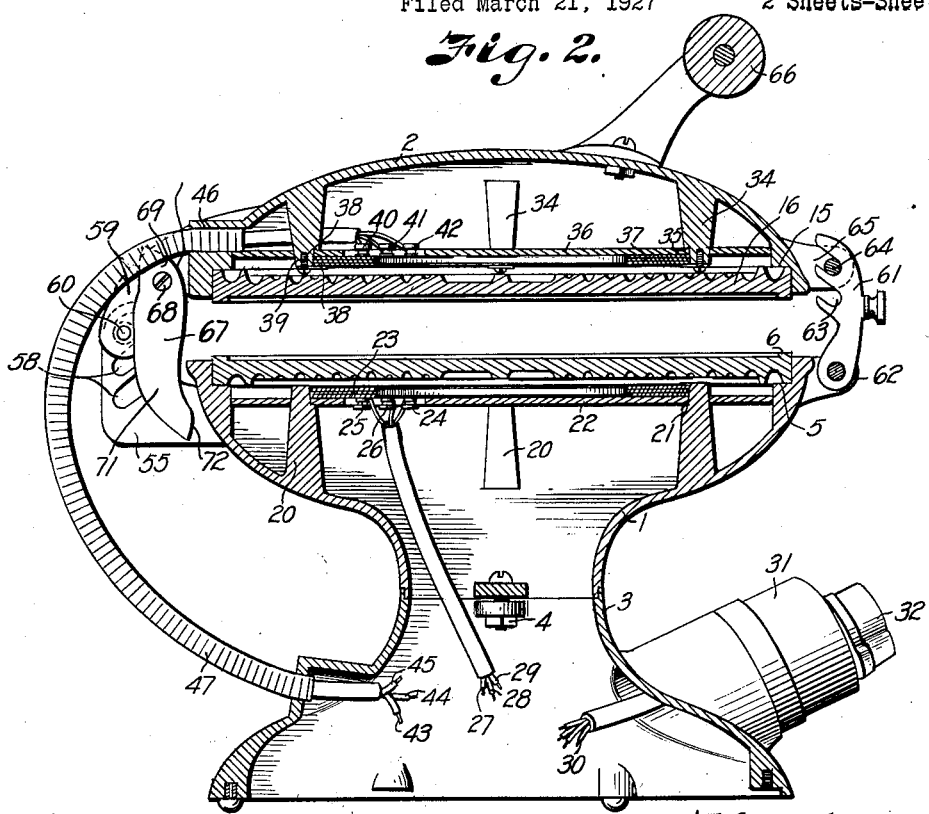
Figure 3:
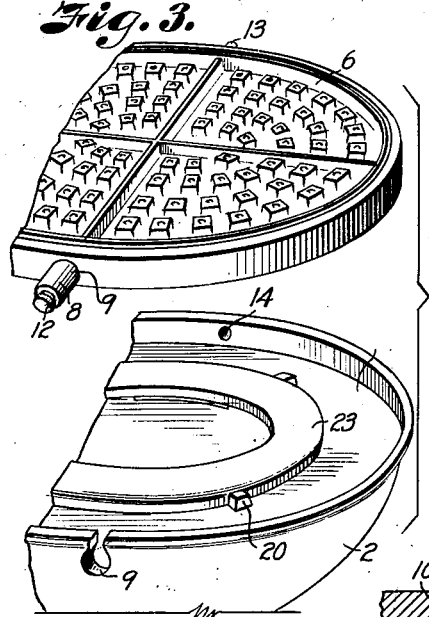
Fig. 3 is a detail fragmentary dissociated view of a guide element.
Figure 4:
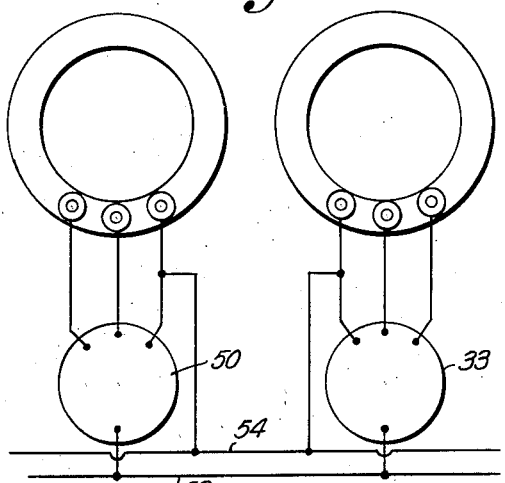
Fig. 4 is a diagrammatic representation of the wiring of the device.

The cover is likewise provided with bosses, in its case numbered 34, having shoulders 35 on which an asbestos shield 36 is positioned, and a metal annulus 37 positioned exterior to the asbestos; in this instance, however, the cover is inverted for functioning, means are provided for holding the metal ring in place, comprising clips 38 fixed in the end apertures 39 of the bosses. The ring 37 is provided with terminals 40, 41 and 42, served by wires 43, 44 and 45 conducted through an opening 46 of the cover by a flexible insulator tube 47 to the hollow pedestal 3, where the disposition is made similar to the case of the base wire, the wires being conducted to the cover switch protected by the housing 48, controlled by the button 49, the whole constructed as illustrated in the portion 50 of the diagram, Fig. 4.

The wire circuit 51 enters the pedestal at 52, the positive wire 53 and the negative wire 54 being connected into both switches 33 and 50, and the switches being adapted to two stages of resistance, so that the base plate may be in one of four conditions, off, full on, on medium and on low, while the cover plate is in any one of the conditions.

I provide for the assembly of the cover member with the base member, in using the device for its chief purpose of subjecting an article of food to heating, toasting or cooking on both sides at one time, brackets 55 and 56 fixed to the base member each having a closed loop 57 provided with a plurality of angularly disposed sockets 58, and the spaced bracket arms 59 secured to the cover member and having the laterally projecting pins 60 insertable into opposite bracket loops and engageable on parallel selected sockets to sustain the hinged end of the cover in selectively spaced relation with the base. Similar means of equally spacing the front portion of the cover and supporting it in spaced relation to the base, is provided comprising the bracket 61 pivoted in the ears 62 attached to the base, having angularly disposed sockets 63 adapted to receive the bar 64 fixed in the ears 65 of the cover, in position for coincidence with said bracket on the base. The cover therefore may be adapted in a variety of spaced relations with the base, and parallel thereto, so that heat may be directed from the cover and the base against bread or other food at the same time, or the cover may be removed entirely, to permit the base heating element to function as a single factor. The bracket 61 is pivotable to permit the reception of the cover bar by one or another of the sockets and may be withdrawn entirely to leave the front surface of the base free when the cover is not in use. The handle 66 is provided for convenient lifting, and replacement of the cover.

Attention is called to the structure and installation of the cover, and the manner in which it is related to the base. The cover is designed for use in co-operation with the base or to be related so that the base may be used alone. I provide means whereby the cover may be braced away from the base but sustained in vertical position handy for disposing in co-operative relation with the base, comprising a latch or brace 67 rotatably mounted on a pivot 68 fixed in an arm 59 of the cover. The latch is provided with an upstanding projection 69 having a shoulder 70 corresponding to the contour of and designed to engage the periphery of the cover, and a depending leg or projection 71 having the curved face 72 and extending sufficiently to engage the base upon translation of the latch member rearwardly of the device and depression of the portion of the cover adjacent the bracket. The latch constitutes a prop for the cover, its effective bearing length between the center of its cover-receiving shoulder 70 and the center of its base-receiving curved face 72 being adjusted to desirable angular positioning of the cover with reference to the base. The provision of the bracing member permits the use of the device on a table in restricted space, since an area to receive the cover need not be available. The user may employ both hands in manipulating food and control elements since the cover may be installed in a position where it will remain.

Attention is called to the structure and installation of my plate members 6 and 16 for the base and cover respectively. These are constructed of suitable heat-absorbing metal, and suitable for the reception of food to be cooked, and opposite sides of a plate member may have different characteristics. I show a plate as having one smooth side, for frying, toasting, and many similar uses and for use when a griddle or grill is also employed; and having its other side corrugated or bossed for waffle iron purposes. A plate is easily removed to be turned and reinstalled to present a different surface to receive the food to be cooked.

What I claim and desire to secure by Letters Patent is:

1. In a toaster, a base, a cover, means for differentially heating the base and the cover, and means for adjustably supporting the cover from the base comprising a plurality of brackets fixed to the base having forwardly opening sockets, a bracket arm element attached to the cover having a plurality of pintles to be received by the said sockets, a post pivoted on the base opposite to the said brackets and having rearwardly opening sockets respectively alignable with said base bracket sockets, and a pin in the cover receivable by the sockets of said post, said pintles and pins being in a plane parallel with the face of the cover.

2. In a toaster, a base, a cover member, a removable griddle in the base, and a removable griddle in the cover co-operating with the first named griddle, means for adjustably hinging the cover to the base, and means opposite to the hinging means for adjustably supporting the cover in parallel alignment with the base.

3. In a toaster, a base, slotted brackets at one side of the base having a plurality of inclined sockets opening into the slotted portion of the brackets, a cover for the base having depending bracket arms co-operating with the first named brackets, means on the bracket arms movable through the slots and engageable in the sockets, and means opposite the brackets for supporting the cover in parallel alignment with the base in relation to the selected sockets.

4. In a cooking device, a base member, a cover member, means mounting the cover pivotally on the base, means for selectively energizing the base and cover members and means for bracing the cover member in an angular position with reference to the base, comprising a weighted latch element pivotally supported from said cover and having projections engageable with the cover and the base, said latch being adapted to swing into engagement with the base upon lifting of the cover to support the cover from the base.

In testimony whereof I affix my signature.

CHARLES A. LEMASTER.